United States Patent [19]
Kaibel et al.

[11] Patent Number: 5,785,819
[45] Date of Patent: Jul. 28, 1998

[54] DISTILLATION COLUMN FOR SEPARATING A LIQUID MIXTURE INTO A PLURALITY OF PURE FRACTIONS

[75] Inventors: Gerd Kaibel, Lampertheim; Manfred Stroezel, Ilvesheim; Joachim Pfeffinger, Ludwigshafen, all of Germany

[73] Assignee: BASF Aktiengesellschaft, Ludwigshafen, Germany

[21] Appl. No.: 674,973

[22] Filed: Jul. 3, 1996

Related U.S. Application Data

[63] Continuation of Ser. No. 293,956, Aug. 24, 1994, abandoned.

[51] Int. Cl.$^6$ ............................................. B01D 3/32
[52] U.S. Cl. ................... 202/158; 202/197; 202/205; 203/49; 203/91; 203/99; 203/DIG. 19
[58] Field of Search ............................ 202/158, 205, 202/269, 197; 159/16.1; 196/111; 203/99, 49, 91, DIG. 19

[56] References Cited

U.S. PATENT DOCUMENTS

| | | | |
|---|---|---|---|
| 2,471,134 | 7/1949 | Wright | 196/100 |
| 4,002,440 | 1/1977 | Saari | 261/76 |
| 4,055,577 | 10/1977 | Saffran et al. | 202/173 |
| 4,230,533 | 10/1980 | Giroux | 203/1 |
| 4,496,430 | 1/1985 | Jenkins | 202/158 |
| 4,832,115 | 5/1989 | Albers et al. | 261/153 |
| 4,919,257 | 4/1990 | Brigham, Sr. et al. | 196/111 |
| 5,014,773 | 5/1991 | Beduz et al. | 165/115 |
| 5,132,055 | 7/1992 | Alleaume et al. | 261/97 |

FOREIGN PATENT DOCUMENTS

| | | |
|---|---|---|
| 122367 | 10/1984 | European Pat. Off. |
| 1031280 | 6/1958 | Germany |
| 143214 | 4/1979 | Germany |

OTHER PUBLICATIONS

*Aiche Journal*, vol. 33, No. 4, Apr. 1987, pp. 643–653.
Chemie Ingenieur Technik, Jan. 1989—vol. 61, Kaibel et al.
Ullmann's Encyclopedia of Industrial Chemistry, Fifth Ed. vol. B3 Unit Operations II.

*Primary Examiner*—Virginia Manoharan
*Attorney, Agent, or Firm*—Keil & Weinkauf

[57] ABSTRACT

In a distillation column for separating a liquid mixture into a plurality of pure fractions, the distillation column being divided into 2 parts, a feed part and a take-off part, in its middle region by a separation effective in the longitudinal direction, the separation consists of two walls with a gas space in between, the distance between the two walls being from 1 to 50 mm, preferably from 3 to 10 mm.

12 Claims, 2 Drawing Sheets

DISTILLATION COLUMN FOR SEPARATING A LIQUID MIXTURE INTO A PLURALITY OF PURE FRACTIONS

This application is a continuation of application Ser. No. 08/293,956, filed on Aug. 24, 1994, now abandoned.

The present invention relates to a distillation column for separating a liquid mixture into a plurality of pure fractions, the distillation column being divided into two parts, a feed part and a take-off part, in its middle region by a separation means effective in the longitudinal direction.

The separation of mixtures comprising a plurality of substances by distillation is described in many publications in the literature. For example, Ullmann's Encyclopädie der Technischen Chemie, 5th edition, Volume B 3, page 58 et seq., describes the separation of mixtures comprising a plurality of substances by connecting a plurality of distillation columns in series. The disadvantage of this process is the expense incurred by the construction of a plurality of distillation columns. Chemie-Ingenieur-Technik 61(1989) No. 2, 104–112 describes a process for separating a mixture comprising a plurality of substances by distillation into a plurality of fractions, in which a distillation column is provided with a separation means effective in the longitudinal direction, with the result that the distillation column is divided into a feed part and a take-off part. With such a distillation column, it is possible to separate a mixture comprising a plurality of substances into a plurality of pure fractions in only one column. The disadvantage of the process described is that there is a flow of heat through the separation means from the warmer to the colder part in distillations with large temperature differences between the feed part and the take-off part. Owing to this and the poor distribution, the separating efficiency of the distillation column decreases and the energy requirement for achieving the desired separation result increases.

It is an object of the present invention to avoid the stated disadvantages.

We have found that this object is achieved, according to the invention, if the separation means consists of two walls with a gas space in between, the distance between the two walls being from 1 to 50 mm, preferably from 3 to 10 mm.

Further features of the novel process form the subject of the subclaims.

The novel separation means reduces or, in the most advantageous case, even prevents the flow of heat through the separation means.

Embodiments of the invention are shown schematically in the drawings and are described in detail below.

BRIEF DESCRIPTION OF THE DRAWINGS

FIG. 1 shows a distillation column having a separation means effective in the longitudinal direction, in which the separation means consists of two walls with a gas space in between.

DETAILED DESCRIPTION OF THE INVENTION

Figure 1:
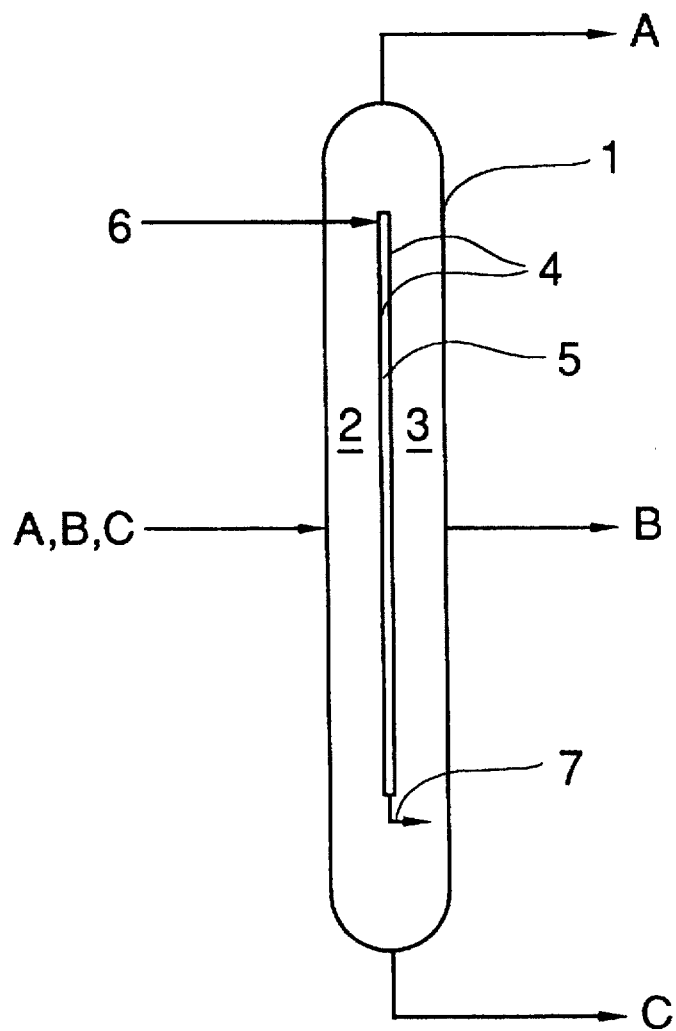

According to FIG. 1, a distillation column 1 is divided into a feed part 2 and a take-off part 3 by two walls 4 mounted in the longitudinal direction. A gas space 5 which is either sealed gas-tight from the distillation space or flushed with an inert gas, for example nitrogen, is present between the two walls. The inert gas preferably enters at the upper end of the gas space and is passed into the distillation space preferably at the lower end of the gas space. It is also possible to fill the gas space 5 with a material having low thermal conductivity or to mount spacers in the gas space between the two walls in order to increase the mechanical stability. In a version having spacers in the gas space, the gas space can be flushed with inert gas as described above or preferably can be sealed gas-tight from the distillation space and evacuated. The mixture comprising a plurality of substances A, B, C is introduced into the feed part 2 and is separated into the pure fractions in the distillation column 1 according to the boiling sequence. The lowest-boiling fraction A is taken off from the column 1 as a top product, and the highest-boiling fraction C is taken off as the bottom product. The medium-boiling fraction B is taken off as a side stream from the take-off part 3.

Figure 2:
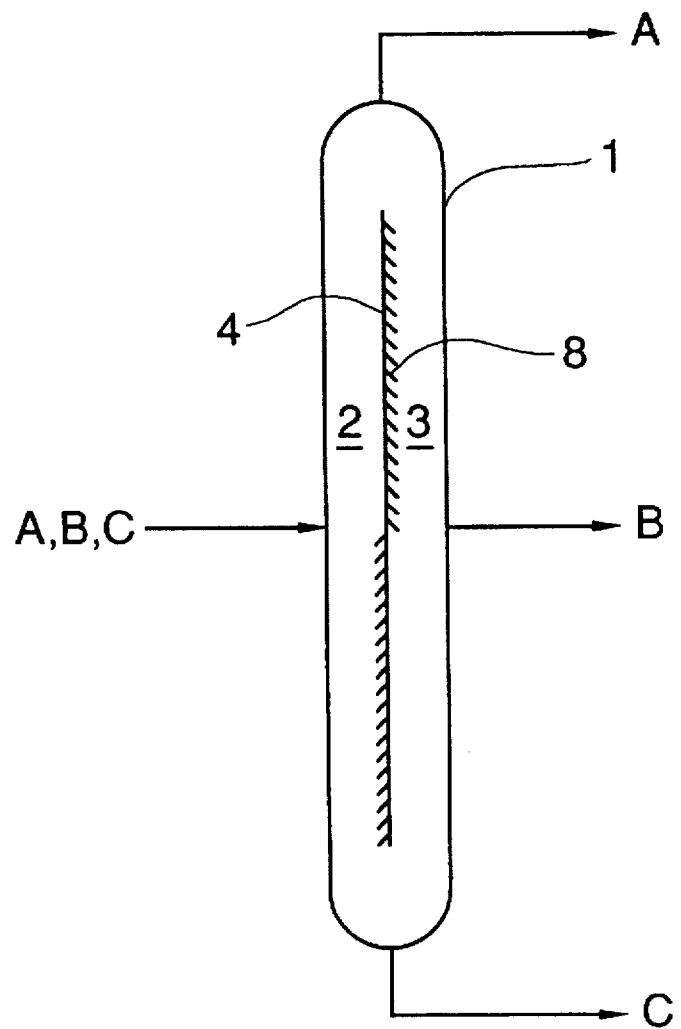
FIG. 2 shows a distillation column having a separation means effective in the longitudinal direction, in which the separation means consists of a wall having liquid deflectors.

According to FIG. 2, the separation means is such that liquid deflectors 8 are mounted, if necessary in sections, on one or both sides of the separation means 4, so that the latter cannot be wetted by the liquid. Advantageously, the liquid deflectors 8 are mounted on the side on which the lower operating temperature prevails in the comparison between feed part 2 and take-off part 3. When stacked packings are used, the liquid deflectors 8 may also be mounted on the packing. If wire fabric or perforated material is used as packing material, the liquid deflectors are preferably designed so that the flow-through pressure loss between the separation means and the packing is higher than in the packing.

We claim:

1. A distillation column for separating a liquid mixture into a plurality of pure fractions, the distillation column being divided into two distillation means, said distillation means having a feed part and a take-off part respectively, the division of the distillation column being formed in its middle region by a separation means effective in the longitudinal direction, wherein the separation means has an upper end and a lower end and consists of two walls with a gas space in between, the distance between the two walls being from 1 to 50 mm, and said gas space is sealed gas-tight from the two distillation means or flushed with inert gas to hinder heat transfer across the separation means.

2. A distillation column as claimed in claim 1, wherein the two walls are flat, are arranged parallel and are provided with spacers in between.

3. A distillation column as claimed in claim 1, wherein the gas space present between the two walls of the separation means is sealed gas-tight from the two distillation means, and the pressure in the gas space is equal to or, lower than the pressure in the two distillation means.

4. A distillation column as claimed in claim 1, wherein a material having lower thermal conductivity than that of the separation means is mounted on one side or on both sides of the separation means.

5. A distillation column as claimed in claim 1, wherein stacked packings are used, and these packings are equipped, on both sides of the separation means or on that side thereof which has an operating temperature lower than the operating temperature of the other side thereof, with liquid deflectors which deflect liquid from the separation means and thus create a gas cushion from 1 to 50 mm thick between the separation means and packing wet with liquid.

6. A distillation column as claimed in claim 5, wherein the material of the liquid deflectors is not perforated or, where stacked packings comprising wire fabric or perforated material are used, has a flow-through pressure loss which is at least equal to or higher than that of the stacked packing.

7. A distillation column as defined in claim 5 wherein the gas cushion is from 3 to 15 mm thick.

8. A distillation column as defined in claim 1 wherein the separation means has an entry and an exit means for allowing the gas space to be flushed with the inert gas and the column has means for direct passing of the gas or means for passing the gas at the top of the column.

9. A distillation column as defined in claim 1 wherein the separation means has an entry means at the upper end of the separation means and an exit means at the lower end of the separation means for allowing the gas space to be flushed with nitrogen and the column has means for direct passing of the nitrogen into the column or means for passing the nitrogen at the top of the column.

10. A distillation column as defined in claim 1 wherein the distance between the two walls is from 3 to 10 mm.

11. A distillation column for separating a liquid mixture into a plurality of pure fractions, the distillation column being divided into two distillation means, said distillation means having a feed part and a take-off part respectively, the division of the distillation column being formed in its middle region by a separation means effective in the longitudinal direction, wherein the separation means has an upper end and a lower end and consists of two walls with a gas space in between, the distance between the two walls being from 1 to 50 mm, and said gas space is sealed gas-tight from the two distillation means or flushed with inert gas to hinder heat transfer across the separation means, wherein column baffles are used and the separation means possesses, on both sides thereof or on that side thereof which has an operating temperature lower than the operating temperature of the other side thereof, liquid deflectors which deflect liquid from the separation means and thus create a gas cushion from 1 to 50 mm thick between the separation means and column baffles wet with liquid.

12. A distillation column as defined in claim 11 wherein the gas cushion is from 5 to 20 mm thick.

* * * * *

UNITED STATES PATENT AND TRADEMARK OFFICE
CERTIFICATE OF CORRECTION

PATENT NO.: 5,785,819

DATED: July 28, 1998

INVENTOR(S): KAIBEL et al.

It is certified that error appears in the above-identified patent and that said Letters Patent is hereby corrected as shown below:

On the cover page, insert the following priority information:

-- [30]  Foreign Application Priority Data
  Aug. 24, 1993   [DE]   Germany ............ P 43 28 424.8--.

Signed and Sealed this

Twenty-second Day of September, 1998

Attest:

BRUCE LEHMAN

*Attesting Officer*        *Commissioner of Patents and Trademarks*